Jan. 15, 1929.
C. CLANIN
PACKING
Filed Sept. 2, 1926
1,698,876
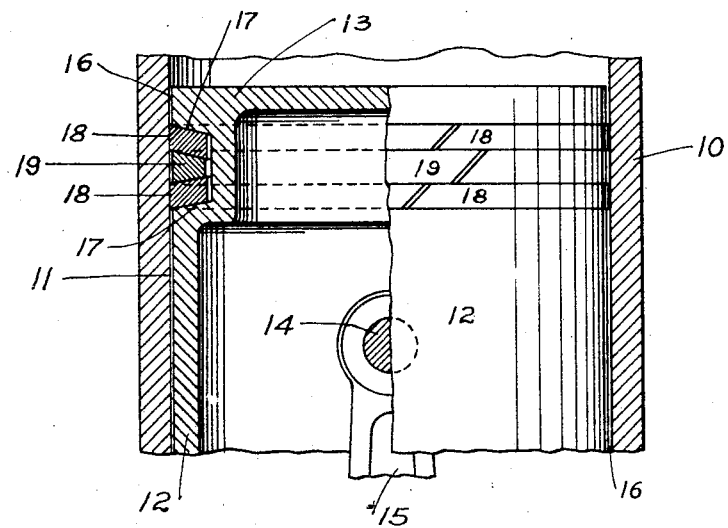
INVENTOR
Clarence Clanin
By
Tefft and Tefft
ATTORNEYS Patented Jan. 15, 1929.

1,698,876

UNITED STATES PATENT OFFICE.

CLARENCE CLANIN, OF PEORIA, ILLINOIS.

PACKING.

Application filed September 2, 1926. Serial No. 133,109.

My invention relates to packing.

The object of my invention is in the provision of a packing of peculiar design to be disposed between a piston and the wall of a cylinder.

Another object of my invention is in the provision of a packing adapted to be disposed between a piston and a cylinder, said packing being of such nature as to insure the even travel of the piston in the cylinder as well as preventing any loss of compression.

Still another object of my invention is in a simple and special manner of fashioning the groove in a piston and the disposition of a special packing therein which is adapted to prevent contact between a worn piston and the cylinder wall as well as preventing loss of compression.

A further object of my invention is in the provision of a special packing and groove for holding same, said packing being adapted to expand in a manner to prevent a loss of compression as well as to prevent the so-called slap of the piston against the cylinder wall.

A still further object of my invention is in the provision of a packing between a piston and cylinder wall, said packing comprising two expansible ring members having parallel side faces conforming to the flared edges of the groove in the piston and a compression ring disposed between said expansion rings adapted to automatically take up the wear on the expansion rings and to prevent sideward movement of a worn piston against the cylinder wall.

Other objects of my invention will appear in the following specification taken in connection with the annexed drawing in which: The figure in the drawing is a side elevation, partially in section, of a cylinder, a piston disposed therein and my special packing means and manner of mounting same. Before referring to the drawing it might be stated that applicant is aware of other types and shapes of plural packing means adapted to compensate for the wear thereon, the same in many instances utilizing a compression ring to expand other rings against the side walls of the piston grooves to prevent loss of compression. Applicant has devised a packing which at first glance might seem to be rather similar to said before mentioned packings but upon careful consideration it may be noted that although applicant's rings are adapted in a rather similar manner to prevent the loss of compression, nevertheless said rings are also adapted to prevent the sideward movement or so-called slap of a worn piston against the cylinder wall.

Referring to the drawings, we find a cylinder 10 of well known construction, the same having the smooth interior wall portion 11. In view of the well known construction, only a portion of the cylinder has been shown. Again, we find a piston 12 disposed within the cylinder, said piston having the conventional head portion 13. A wrist pin 14 is pivoted with respect to the piston, the same being driven by the conventional connecting rod 15. So far only conventional engine or pump design has been described. Inasmuch as applicant's packing is adapted for use especially in connection with pistons and cylinders upon which there has been an appreciable amount of wear, such wear has been shown between the piston and cylinder at 16. Applicant's manner of packing is adapted to be used in an engine having had considerable use, the original piston rings having become worn. The piston 12 has ordinarily fashioned thereon a groove, the sides of which are usually parallel and at right angles to the cylinder wall and face of the piston.

Now applicant, in order to fit his packing into the piston groove, must necessarily and by some mechanical means flare the edges of the piston groove outwardly in an angular manner as shown at 17. By fashioning the edges of the piston groove in this manner, he may thereafter place therein his three rings which form a packing between the piston and the cylinder wall, this packing including the two expansible and resilient rings 18, said rings having their side portions parallel to each other as well as conforming to the angle of the flared edges 17 of the piston groove. The outer edges of the expansible rings 18 obviously contact and conform to the cylinder wall 11. Just as the rings 18 expand in a tensioned manner against the cylinder wall an intermediate compression ring 19 disposed between said rings 18 has a tendency to compress toward the piston and in an exactly opposite direction. This intermediate compression ring 19 has its side faces fashioned to conform to the inner faces of the rings 18 as may be clearly shown in the drawing. The compression ring does not contact the cylinder wall but has a tendency at all times to exert its compressive strength against the expansible rings to prevent the leakage of compression around said rings and through the groove portion.

Now with respect to the function of the present packing to prevent this sideward movement or slap of the piston against the cylinder wall, we find that although the expansible rings 18 may slide in a resilient manner inwardly and outwardly with respect to the edges of the piston groove and the compression ring, that nevertheless the piston is prevented from sliding toward the cylinder wall inasmuch as any movement of the piston toward the cylinder wall results in an increasing tensioning of the compression ring with respect to the expansible rings due to the outward flaring of the piston groove and by preventing movement of the piston in that direction. It would seem necessary to enlarge on this function of the present packing inasmuch as this is the main distinction between this packing and the automatic packing which merely prevents the loss of compression and also the flow of oil around the inside of the rings. If the piston attempts to move sideward against the cylinder, there is a jambing action between the compression ring and the expansible rings, which prevents the sideward movement. Obviously, this jambing action will take place when the piston groove is filled with plural ring members having their outer edges of a greater width than their inner edges, which lie at the base or bottom of the piston groove. In any packing structure wherein the groove is either the same width at the bottom and outer parts or wherein the outward part is of lesser width than the bottom portion, the piston will be permitted to slide sideward against the cylinder wall, although possibly resisted by the tension of the rings.

Applicant has devised such packing and groove therefor that there is absolutely prevented the so-called piston slap, and the even travel of the piston is insured, the packing at the same time operating in an efficient manner to prevent the loss of compression.

Although applicant has shown in his drawing only one form of packing adapted to prevent this slapping of the piston, nevertheless it is obvious that a rather similar but possibly not as efficient result might be accomplished by using but one expansible ring. However, it must be borne in mind that to prevent this outward movement of the piston, there must always be a groove, the sides of which are flared outwardly to permit the resisting movement of the rings against this sideward movement of the piston.

It is possible that the fashioning of the rings, irrespective of the form of the groove, might be such as to accomplish this absolute resistance to the sideward or slapping action of the piston.

What I claim is:

In combination, a cylinder, a piston disposed therein, means for insuring even travel of the piston with respect to the cylinder when worn, including a groove having the side portions thereof flared outwardly from the juncture of the side walls and the bottom of said groove, a packing for said groove comprising two expansible resilient ring members terminating closely adjacent the bottom of said groove, said ring members having substantially parallel side portions conforming to the angle of the flared edges of the piston groove, and a compression ring disposed between the expansible rings terminating closely adjacent to the bottom of said groove and not contacting the cylinder wall, thereby forming an oil groove, said compression ring being adapted to take up the wear on said rings as well as prevent contact of the piston against the cylinder.

In testimony whereof, I have hereunto affixed my signature.

CLARENCE CLANIN.